United States Patent
Okada et al.

(10) Patent No.: US 9,205,872 B2
(45) Date of Patent: Dec. 8, 2015

(54) VEHICLE BODY STRUCTURE

(71) Applicant: Mitsubishi Jidosha Kogyo Kabushiki Kaisha, Tokyo (JP)

(72) Inventors: Yusuke Okada, Tokyo (JP); Hideki Takeuchi, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/280,747

(22) Filed: May 19, 2014

(65) Prior Publication Data

US 2014/0338997 A1 Nov. 20, 2014

(30) Foreign Application Priority Data

May 20, 2013 (JP) ................. 2013-106278

(51) Int. Cl.
| | |
|---|---|
| *B60R 16/04* | (2006.01) |
| *B62D 25/20* | (2006.01) |
| *B62D 25/00* | (2006.01) |
| *B62D 25/02* | (2006.01) |
| *B62D 25/08* | (2006.01) |

(52) U.S. Cl.
CPC .............. *B62D 25/20* (2013.01); *B62D 25/00* (2013.01); *B62D 25/02* (2013.01); *B62D 25/08* (2013.01)

(58) Field of Classification Search
CPC .............. B60K 2001/0422; B60K 2001/0433; B60K 2001/0438; B60R 16/04; H01M 2/1083
See application file for complete search history.

(56) References Cited

U.S. PATENT DOCUMENTS

2006/0237248 A1* 10/2006 Hayashi ................. 180/68.5
2007/0128507 A1 6/2007 Watanabe et al.

FOREIGN PATENT DOCUMENTS

| JP | 3-32989 A | 2/1991 |
|---|---|---|
| JP | 7-89462 A | 4/1995 |
| JP | 9-39839 A | 2/1997 |
| JP | 2000-247261 A | 9/2000 |
| JP | 2003-2249 A | 1/2003 |
| JP | 2007-15612 A | 1/2007 |
| JP | 4637666 B2 | 2/2011 |
| WO | WO 2004/071798 A1 | 8/2004 |

OTHER PUBLICATIONS

Extended European Search Report issued Aug. 12, 2014 for the corresponding European patent Application No. 14168771.5.
Office Action mailed Jul. 18, 2014 for corresponding Japanese Application No. 2013-106278 with an English translation.

\* cited by examiner

*Primary Examiner* — Jeffrey J Restifo
*Assistant Examiner* — Erez Gurari
(74) *Attorney, Agent, or Firm* — Birch, Stewart, Kolasch & Birch, LLP

(57) ABSTRACT

A vehicle body structure is provided to avoid the damage to a battery pack due to invasion of an electric device in a side impact crash. The vehicle body structure includes a battery pack on its inner side in a vehicle width direction, and an electric device on its outer side. A No1 seat cross member 5 is provided along in the vehicle width direction of the floor panel 3. The No1 seat cross member 5 is provided with a weak portion 54 in a position in the vehicle width direction corresponding to between the battery pack 2 and an electric hot-water heater 9 as the electric device.

12 Claims, 7 Drawing Sheets

VEHICLE BODY STRUCTURE

BACKGROUND OF THE INVENTION

1. Field of the Invention

The present disclosure relates to a vehicle body structure including a battery pack mounted on its inner side in a vehicle width direction, and an electric device mounted on its outer side in the vehicle width direction beside the battery pack.

2. Description of the Related Arts

Patent Document 1 discloses a vehicle body structure including a fuel battery stack corresponding to a battery pack and mounted on its inner side in a vehicle width direction, and a heater or DC-DC converter corresponding to an electric device and mounted on its outer side in the vehicle width direction beside the fuel battery stack.

As shown in FIG. 10, in the vehicle body structure disclosed in Patent Document 1 (Japanese Patent Publication No. 4637666), a battery pack 102 is mounted on its inner side in the vehicle width direction, and an electric device 109 is mounted on its outer side in the vehicle width direction beside the battery pack 102. In a side impact crash against the vehicle body, a large load P might be imposed on the electric device 109, causing the electric device 109 to invade the battery pack 102, which could lead to damage to the battery pack 102 or a battery cell included in the battery pack 102.

The present invention has been made in view of the foregoing problems, and it is an object of at least one embodiment of the invention to provide a new and improved vehicle body structure including a battery pack mounted on its inner side in the vehicle width direction and an electric device on its outer side in the vehicle width direction beside the battery pack, and which can avoid the damage to the battery pack and battery cell due to the invasion of the electric device even under a large load caused by a side impact crash against the body structure.

SUMMARY OF THE INVENTION

A vehicle body structure according to at least one embodiment of the invention includes a floor panel; a battery pack mounted under a center of the floor panel in a vehicle width direction; an electric device mounted on an outer side in the vehicle width direction of the battery pack; and a cross member provided to extend over an upper surface of the floor panel in the vehicle width direction, the cross member being provided with a weak portion in a position corresponding to between the battery pack and the electric device.

In the at least one embodiment of the invention, the cross member is configured to be bent in the position between the battery pack and electric device in the vehicle width direction. Thus, when the vehicle is involved in a side impact crash, the cross member is bent and folded in the position between the battery pack and electric device in the vehicle width direction. This arrangement can displace the direction of invasion of the electric device from the battery pack to avoid the damage to the battery pack or battery cell in the electric device.

At this time, in the one embodiment of the invention, the cross member is configured to be a seat cross member for supporting a seat of the vehicle thereabove. In this way, the cross member can also serve as the seat cross member.

In the one embodiment of the invention, the floor panel is formed in a stepped shape in the vehicle width direction, so that the floor panel includes a high floor region for mounting the battery pack thereat, and a low floor region for mounting the electric device thereat, and the cross member is provided with the weak portion located in a position corresponding to an edge of the high floor region of the floor panel on a side of the lower floor region.

In this way, the cross member is bent and folded in the position in the vehicle width direction corresponding to the edge of the high floor region on the side of the lower floor region. Thus, when the vehicle is involved in a side impact crash, the cross member is bent in the position in the vehicle width direction at the edge of the high floor region on the side of the low floor region. This arrangement can displace the direction of invasion of the electric device from the battery pack to avoid the damage to the battery pack or battery cell in the electric device.

In the one embodiment of the invention, the battery pack is mounted under the high floor region, and the electric device is mounted on the low floor region.

In this way, when the cross member is bent, the battery pack escapes downward, and the electric device escapes upward. This arrangement can surely displace the direction of invasion of the electric device from the battery pack to avoid the damage to the battery pack or battery cell in the electric device.

In the one embodiment of the invention, a floor stringer is further provided to extend in a front-back direction of the vehicle beneath the low floor region, the floor stringer being attached to the cross member, and the battery pack is attached to the floor stringer.

In this way, when the cross member is bent and folded, the battery pack is moved downward together with the floor stringer. Thus, the battery pack can surely escape under the floor panel to avoid the damage to the battery pack or battery cell in the electric device.

In the one embodiment of the invention, the cross member is configured to be bent with the weak portion located in a bending position and moved downward so as to raise the electric device relative to the weak portion.

In this way, the cross member is bent and moved downward to raise the electric device, so that the invasion direction of the electric device can be surely displaced from the battery pack and battery cell to more surely avoid the damage to the battery pack and battery cell.

In the one embodiment of the invention, the cross member has a groove shape with a lower surface thereof opened, and having a rectangular section, and the weak portion has a hole passing through a corner portion of the section.

Thus, the hole passing through the corner portion of the section can effectively form the weak portion.

DESCRIPTION OF THE PREFERRED EMBODIMENTS

In the following, preferred embodiments of the invention will be described in detail. The following embodiments of the invention are illustrative byway of example, and are not intended to limit the scope of the invention, which is defined by the appended claims and equivalents thereof. All components described in the embodiments below are not necessarily essential as solving means of the invention.

Now, the invention will be described below by taking as an example, a vehicle body structure employing a hybrid (HV) system or an electric vehicle (EV) system with a motor for driving and a battery for driving (battery pack) mounted thereon in addition to the engine.

Figure 1:
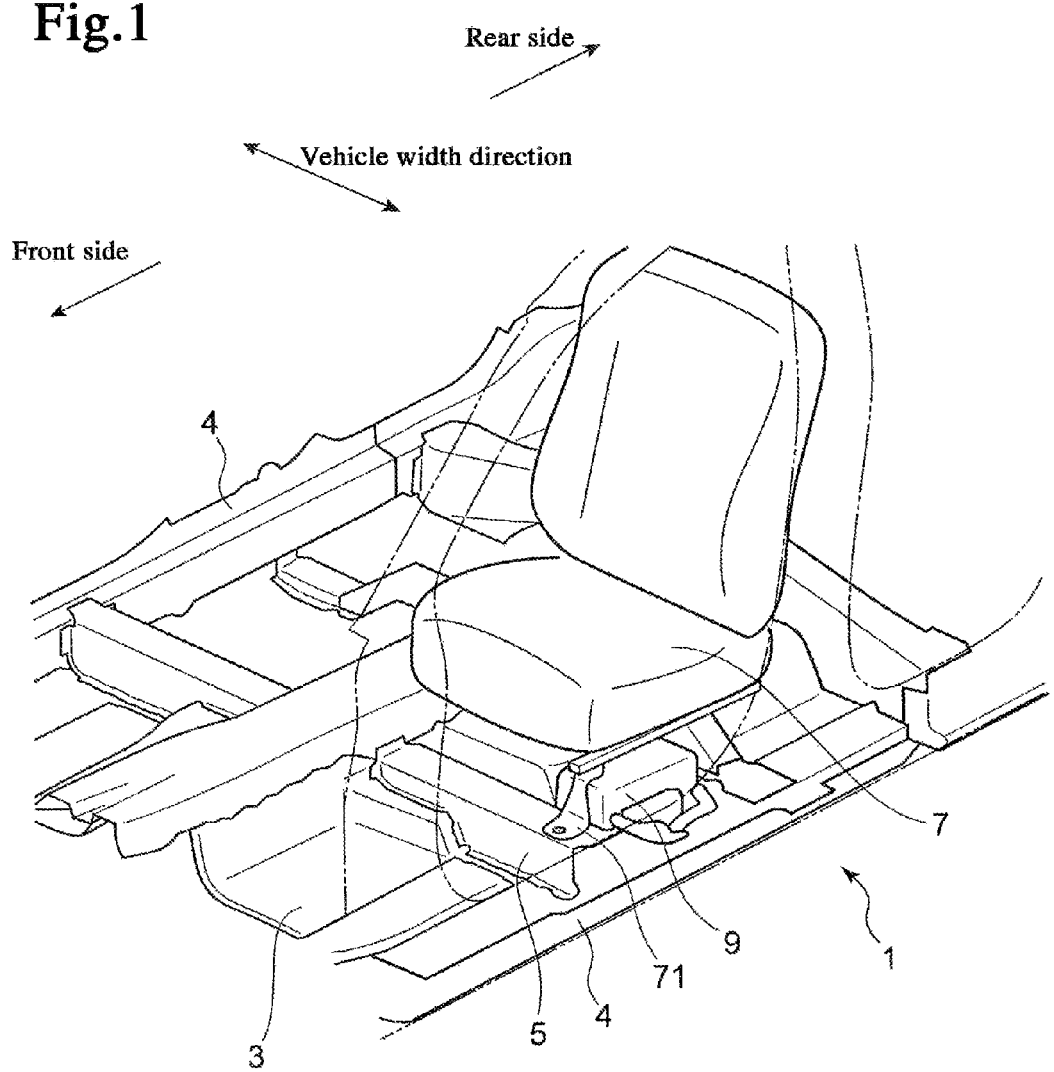
FIG. 1 is a perspective view showing a main part of the vehicle body structure in one embodiment.
Figure 2:
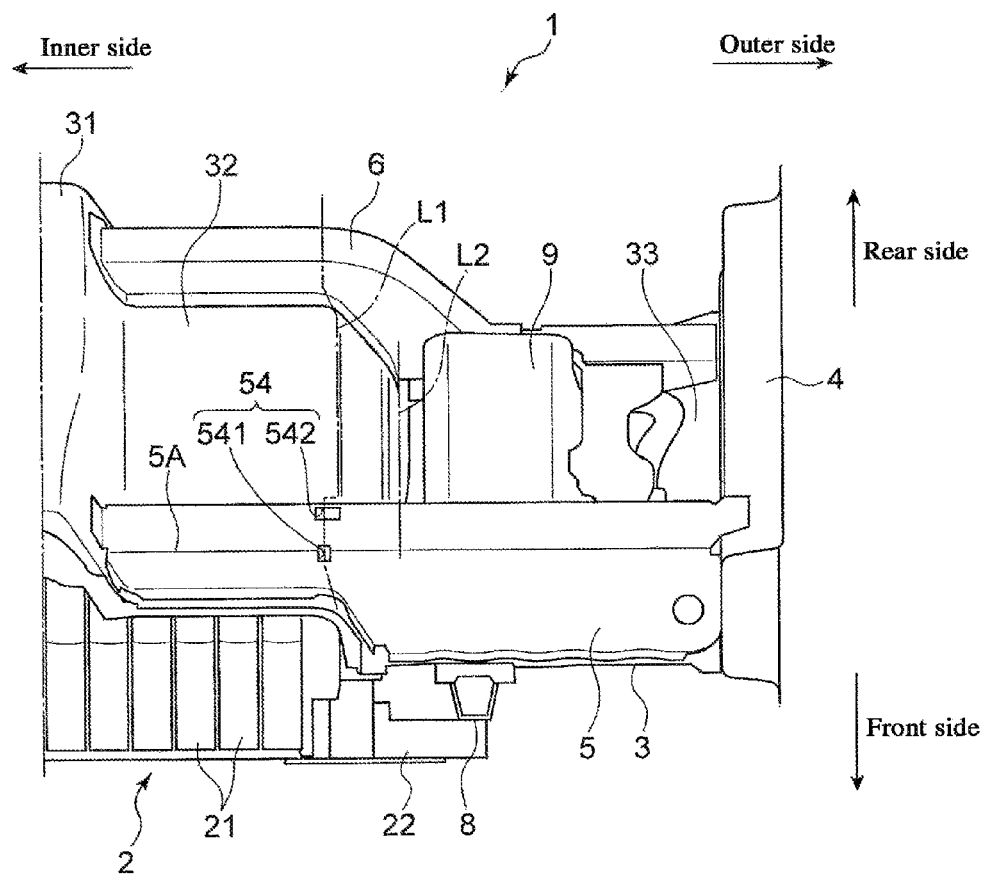
FIG. 2 is a perspective view from a front upper oblique direction of the main part of the vehicle body structure shown in FIG. 1.
Figure 3:
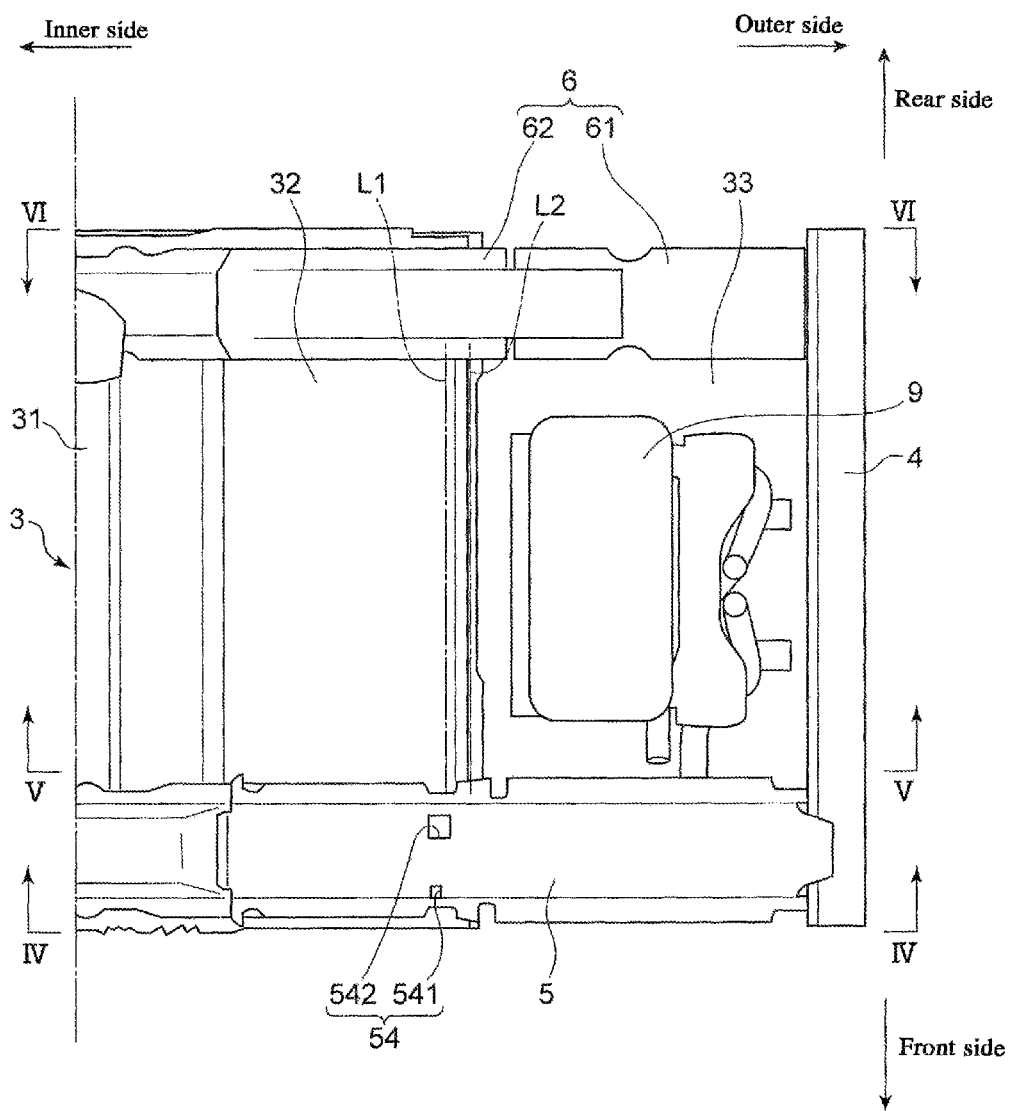
FIG. 3 is a plan view showing the main part of the vehicle body structure shown in FIG. 2.
Figure 4:
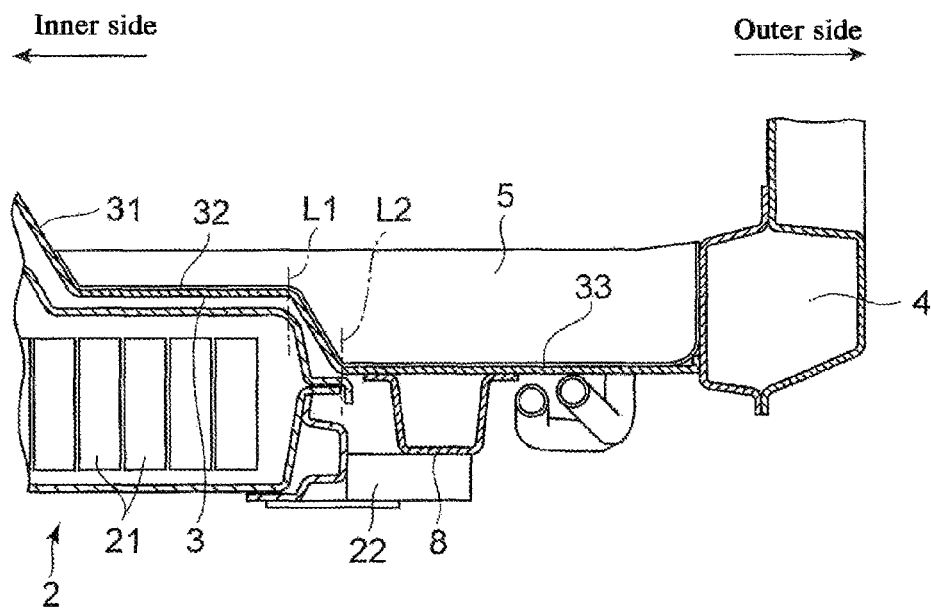
FIG. 4 is a cross-sectional view taken along the line IV-IV of the main part of the vehicle body structure shown in FIG. 3.
Figure 5:
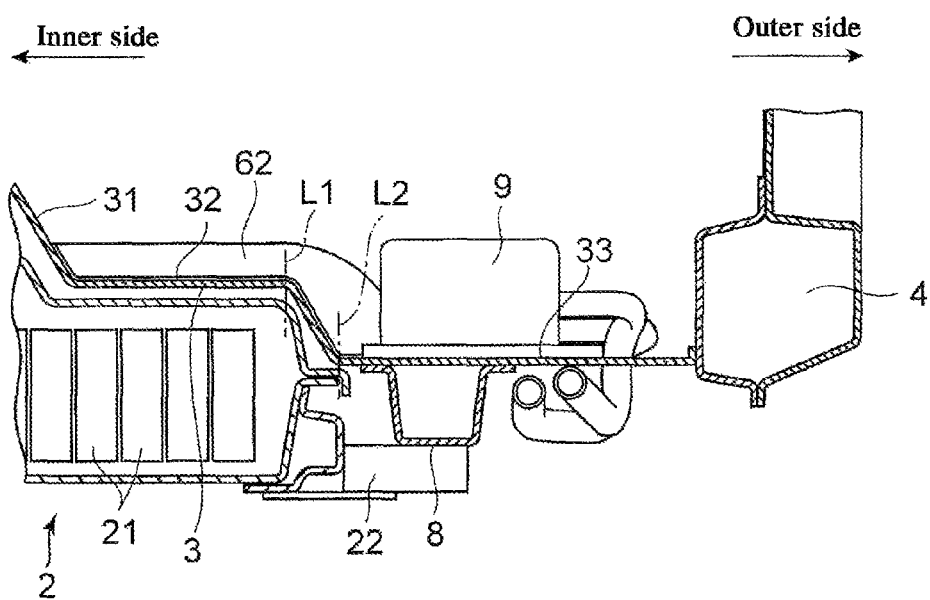
FIG. 5 is a cross-sectional view taken along the line V-V of the main part of the vehicle body structure shown in FIG. 3.
Figure 6:
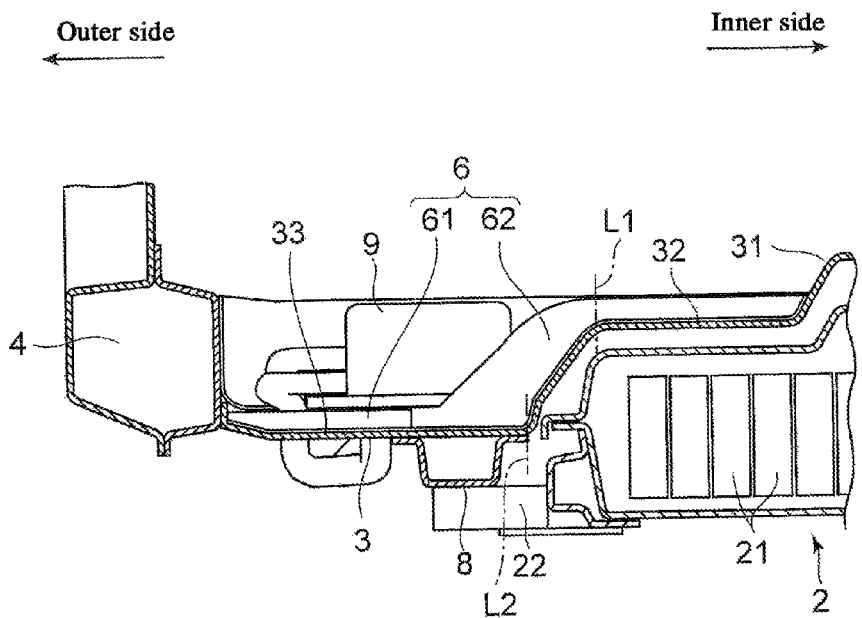
FIG. 6 is a cross-sectional view taken along the line VI-VI of the main part of the vehicle body structure shown in FIG. 3.

FIG. 1 shows a perspective view of a main part of the vehicle body structure in this embodiment. FIG. 2 shows a perspective view from a front upper oblique direction of the main part of the vehicle body structure shown in FIG. 1. FIG. 3 shows a plan view of the main part of the vehicle body structure shown in FIG. 2. FIGS. 4 to 6 are cross-sectional views showing the main part of the vehicle body structure shown in shown in FIG. 3. FIG. 1 illustrates only a left front seat in a vehicle compartment, and omits a right front seat and rear seats.

As shown in FIG. 2, the vehicle body structure of this embodiment includes a battery pack (battery for driving) 2 mounted at the substantially center thereof in the vehicle width direction. The battery pack holds a combination of a plurality of battery cells 21. The vehicle body structure also includes an electric hot-water heater (electric device) 9 to be described later mounted on an outer side thereof in the vehicle width direction beside the battery pack. Thus, the battery pack 2 and the electric hot-water heater 9 are superimposed over each other in the height direction. Further, the vehicle body structure includes a floor panel 3, side sills 4, a No1 seat cross member 5, and a No2 seat cross member 6.

As shown in FIG. 1, the floor panel 3 constitutes a floor for partitioning the vehicle compartment inside a vehicle body 1. Seats 7 are placed in two lines on the left and right sides above the floor panel 3. A backbone 31 (see FIG. 2), which is also referred to as a floor tunnel, is mounted at the center of the floor panel 3 in the vehicle width direction. The backbone 31 protrudes into the vehicle compartment, and extends in the front-back direction, thereby partitioning the floor panel 3 into right and left sides in the vehicle width direction to separate the seat 7 mounted on the right side in the vehicle width direction (not shown) from the seat 7 on the left side.

As show in FIGS. 2 to 6, the floor panel 3 of this embodiment is formed in a stepped shape in the vehicle width direction such that an inner region 32 in the vehicle width direction is positioned at a higher level than an outer region 33 so as to ensure a space for placing the battery pack 2 under the backbone 31. Thus, boundaries L1 and L2 are provided between the inner region 32 and the outer region 33 in the vehicle width direction. The region 32 located on the inner side with respect to the boundary L1 is a high floor, whereas the region 33 located on the outer side with respect to the boundary L2 is a low floor.

As shown in FIGS. 2 to 6, the side sills 4 are provided along the side edges of the above-mentioned floor panel 3 to constitute the side frame of the vehicle body 1. Thus, a convex portion is formed between the side sill 4 and an edge (boundary L1) of the high floor region 32 provided in the floor panel 3 on a side of the lower floor region (see FIGS. 5 and 6).

As shown in FIGS. 2 and 4, the No1 seat cross member 5 is a reinforcing member for transferring a load caused by a side impact crash from the side sill 4 to the inner side in the vehicle width direction. The seat cross member 5 is mounted between the side sill 4 and the backbone 31 provided at the floor panel 3 in the position that supports a front leg 71 (see FIG. 1) of the seat 7 serving as a front seat. Thus, the No1 seat cross member 5 supports the vehicle seat 7 thereabove.

Figure 7:
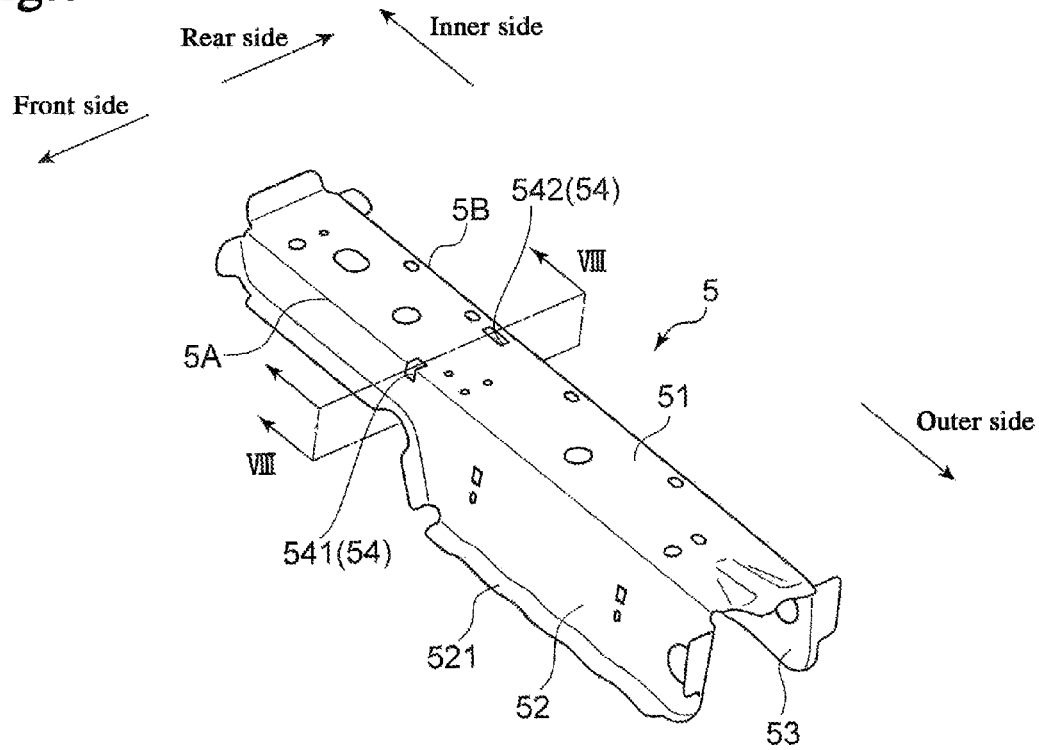
FIG. 7 is a perspective view showing a No1 cross member shown in FIGS. 2 to 4.
Figure 8:
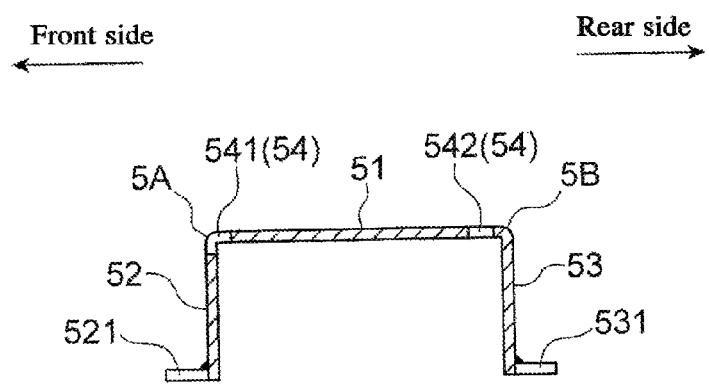
FIG. 8 is a cross-sectional view taken along the line VIII-VIII of FIG. 7.

As shown in FIGS. 7 and 8, the No1 seat cross member 5 has a groove shape with a lower surface thereof opened, and having a rectangular section. The seat cross member 5 includes an upper plate portion 51, a front plate portion 52, and a rear plate portion 53. The upper plate portion 51 is a part for mounting, on its upper surface, the front leg 71 for supporting the seat 7, and is formed horizontally in the vehicle width direction. The front plate portion 52 extends downward from the front edge of the upper plate portion 51 to form a corner portion 5A forming a ridge line at the front edge of the upper plate portion 51. As shown in FIG. 4, the lower edge of the front plate portion 52 is formed along the shape of the floor panel 3, and is made deeper in the low floor region 33 (outside the boundary L2) of the floor panel 3, and shallower in the higher floor region (inside the boundary L1). As shown in FIG. 7, an edge 521 extending toward the front side of the vehicle body is provided at the lower edge of the front plate portion 52 to be bonded to the floor panel 3. Like the front plate portion 52, the rear plate portion 53 extends downward from the rear edge of the upper plate portion 51 to form a corner portion 5B forming a ridge line at the rear edge of the upper plate portion 51. Like the lower edge of the front plate portion 52, the lower edge of the rear plate portion 53 is formed along the shape of the floor panel 3, and is made deeper in the low floor region 33 (outside the boundary L2) of the floor panel 3, and shallower in the higher floor region 32 (inside the boundary L1). The edge 531 extending toward the rear side of the vehicle body is provided at the lower edge of the rear plate portion 53 to be bonded to the floor panel 3.

As shown in FIGS. 3 and 6, like the No1 seat cross member 5, the No2 seat cross member 6 is a reinforcing member for transferring a load caused by a side impact crash from the side sill 4 to the floor panel 3 or the backbone 31 provided in the floor panel 3. The seat cross member 6 is mounted between the side sill 4 and the backbone 31 provided at the floor panel 3 in the position that supports a rear leg (not shown) of the seat 7 serving as the front seat. Thus, the No2 seat cross member 6 supports the vehicle seat 7 thereabove.

The No2 seat cross member 6 has a small stiffness as compared to the No1 seat cross member 5, and is made by connecting a first member 61 to a second member 62. In the No2 seat cross member 6, one end of the first member 61 is connected to the side sill 4, and one end of the second member 62 is connected to the backbone 31 formed at the floor panel 3.

The first member 61 included in the No2 seat cross member 6 is a lower member than the No1 seat cross member 5. However, like the No1 seat cross member 5, the No2 cross member 6 has a groove shape with a lower surface thereof opened, and having a rectangular section, and is mounted in the low floor region 33 of the floor panel 3 (outside the boundary L2). Like the first member 61, the second member 62 forming the No2 seat cross member 6 has a groove shape with a lower surface thereof opened, and having a rectangular section. The second member 62 is formed to be curved toward the first member 61 in the low floor region of the floor panel 3 (outside the boundary L1). The second member 62 is mounted to extend from the high floor region 32 of the floor panel 3 (inside the boundary L1) to the midpoint of the low floor region 33 (outside the boundary L2).

As shown in FIGS. 2, and 4 to 6, a floor stringer 8 is provided beneath and within the low floor region 33 (outside the boundary L2) of the floor panel 3. The floor stringer 8 is a reinforcing member extending in the front-back direction of the vehicle body, and mounted at the No1 seat cross member 5 and the No2 seat cross member 6 via the floor panel 3.

The floor stringer 8 serves as a mounting member for mounting the battery pack 2 under the floor panel 3 below the backbone 31. A battery bracket 22 formed at the battery pack 2 is mounted on the floor stringer 8.

The above-mentioned seat 7 is mounted to straddle between the No1 seat cross member 5 and the No2 seat cross member 6.

As shown in FIGS. 1 to 3, an electric hot-water heater (electric device) 9 is mounted substantially directly under the left front seat 7 beside the battery pack 2. As shown in FIGS. 2 and 3, the electric hot-water heater 9 is mounted in the lower region 33 (outside the boundary L2) of the floor panel 3, and accommodated in between the floor panel 3 and the seat 7.

The No1 seat cross member 5 of the above-mentioned embodiment is provided with a weak portion 54 in a position in the vehicle width direction between the battery pack 2 and the electric hot-water heater 9. The No1 seat cross member 5 is configured to be bent at the weak portion 54 under a load exceeding a predetermined load.

Specifically, the weak portion 54 is provided in the position in the vehicle width direction corresponding to the edge (boundary L1) of the high floor region 32 of the floor panel 3 on the low floor region side. As shown in FIGS. 7 and 8, the weak portion 54 includes a pair of holes 541 and 542 in the front-back direction of the vehicle body. Referring to FIGS. 2 and 3, a pair of holes 541 and 542 are positioned in parallel to the edge (boundary L1) of the high floor region 32 of the floor panel 3 on the side of the low floor region. As shown in FIGS. 7 and 8, one hole 541 is rectangular, and passes through the corner portion 5A formed at the front edge of the upper plate portion 51, where the other hole 542 is a rectangular hole larger than the one hole 541, and passes through a position in the vicinity of the corner portion 5B formed at the rear edge of the upper plate portion 51.

The weak portion 54 is provided in the No1 seat cross member 5 and not in the No2 seat cross member 6. This is because the stiffness of the No1 seat cross member 5 is larger than that of the No2 seat cross member 6. When the load P caused by the side impact crash exceeds the predetermined load, the bending of the No1 seat cross member 5 causes the invasion direction of the electric hot-water heater 9 to escape from the battery pack 2.

The pair of holes 541 and 542 is provided in parallel to the edge (boundary L1) of the high region 32 of the floor panel 3 on the low floor region side in order to bent the edge (boundary L1) of the high floor region 32 on the low floor region side. As long as variations in shape or position of a bending line are allowed, only one hole (for example, one hole 541) can form the weak portion 54.

The holes 541 and 542 are provided on both the front edge (corner portion 5A) and the rear edge (position in the vicinity of the corner portion 5B) of the upper plate portion 51, whereby the bending position (bending line) of the No1 seat cross member 5 can be stabilized.

The one hole 541 passes through the corner portion 5A formed at the front edge of the upper plate portion 51, leading to breaking of a ridge line, which effectively and accurately bend the No1 seat cross member 5. The other hole 542 does not pass through the corner portion 5B formed at the rear edge of the upper plate portion 51, allowing a harness for inputting and outputting an electric signal to pass along the inner side of the corner portion 5B, which can avoid the harness from rubbing against the holes. Thus, when the harness does not need to be drawn, the other hole 542 may pass through the corner portion 5B formed in the rear edge.

The other hole 542 is formed to be larger than one hole 541. This is because the other hole 542 does not pass through the corner portion 5B formed at its rear edge. The seat cross member can be bent by making the other hole 542 larger even when the other hole does not pass through the corner portion 5B.

Figure 9:
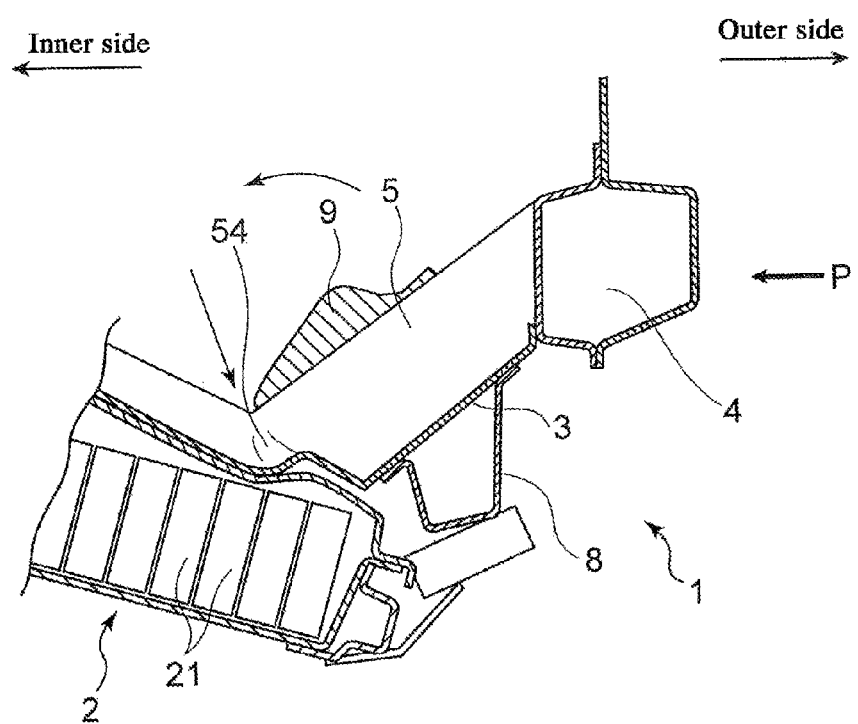
FIG. 9 is a schematic diagram viewed from the front side, while showing the modified state of the vehicle body structure in this embodiment.
Figure 10:
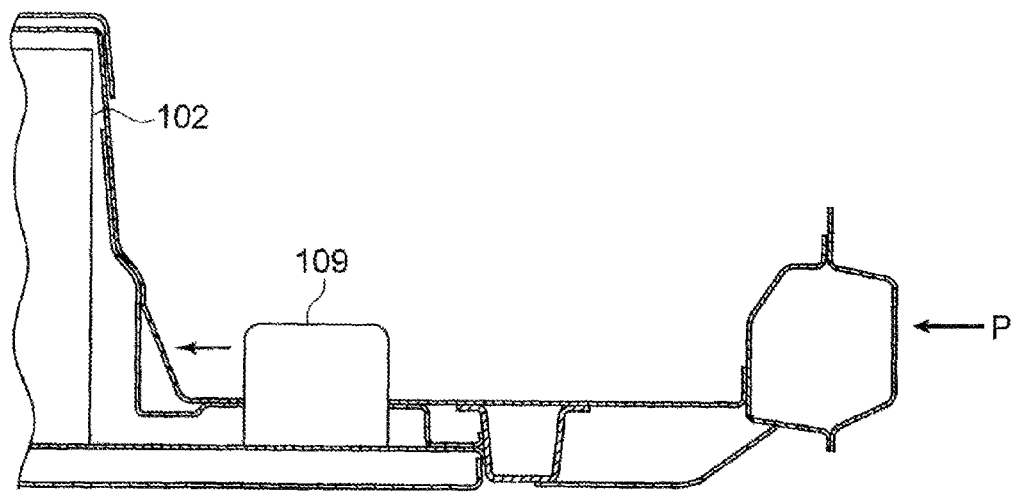
FIG. 10 is a schematic diagram showing a conventional vehicle body structure.

In the vehicle body structure of this embodiment as described above, the No1 seat cross member 5 is bent in the position in the vehicle width direction positioned between the battery pack 2 and the electric hot-water heater 9 under a load exceeding the predetermined load. When the load P caused by the side impact crash exceeds the predetermined load, as shown in FIG. 9, the No1 seat cross member 5 is bent in the position in the vehicle width direction positioned between the battery pack 2 and the electric hot-water heater 9.

More specifically, the No1 seat cross member 5 is bent in the vehicle width direction at the edge (boundary L1) of the high level region 32 on the low floor region side under the load exceeding the predetermined load. When the load P caused by the side impact crash against the vehicle body exceeds the predetermined load, the No1 seat cross member 5 is bent in the position in the vehicle width direction positioned at the edge (boundary L1) of the high region 32 on the low region side. This arrangement can displace the direction of invasion of the electric hot-water heater 9 from the battery pack 2 to avoid the damage to the battery pack 2 and battery cell 21 by the electric hot-water heater 9.

In the above vehicle body structure, when the No1 seat cross member 5 is bent, the battery pack 2 is moved downward together with the floor stringer 8. This arrangement can surely displace the direction of invasion of the electric hot-water heater 9 from the battery pack 2 to more surely avoid the damage to the battery pack 2 and battery cell 21.

In the vehicle body structure described above, the No1 seat cross member 5 is configured to be bent downward to raise the electric hot-water heater 9. This arrangement can surely displace the direction of invasion of the electric hot-water heater 9 from the battery pack 2 or battery cell 21 to more surely avoid the damage to the battery pack 2 and battery cell 21.

Although the respective embodiments of the invention have been described above in detail, it is easily understood to those skilled in the art that various modifications and changes can be made without substantially departing from new matters and effects of the invention. Those modified examples fall within the scope of the present invention.

For example, a term described in the specification or drawings at least one time together with a different term having a wider or similar meaning can be replaced by the different term in any position of the specification or drawings. The structure and operation of the vehicle body structure are not limited to those described in the embodiments of the invention, and various modifications and changes can be made to those embodiments.

INDUSTRIAL APPLICABILITY

At least one embodiment of the present invention is suitable in any other vehicle body structure that includes a battery pack mounted on its inner side in the vehicle width direction, and an electric device on its outer side in the vehicle width direction beside the battery pack.

What is claimed is:

1. A vehicle body structure, comprising:
a floor panel;
a battery pack mounted under a center of the floor panel in a vehicle width direction;
an electric device mounted on an outer side in the vehicle width direction of the battery pack; and
a cross member provided to extend over an upper surface of the floor panel in the vehicle width direction, the cross member being provided with a weak portion in a position corresponding to between the battery pack and the electric device,
wherein the floor panel is formed in a stepped shape in the vehicle width direction, so that the floor panel includes a high floor region for mounting the battery pack thereat, and a low floor region for mounting the electric device thereat,
wherein the cross member is provided with the weak portion located in a position corresponding to an edge of the high floor region of the floor panel on a side of the lower floor region, and
wherein the battery pack is mounted under the high floor region, and the electric device is mounted on the low floor region.

2. The vehicle body structure according to claim 1, wherein the cross member is a seat cross member for supporting a seat of the vehicle thereabove.

3. The vehicle body structure according to claim 1, further comprising:
a floor stringer extending in a front-back direction of the vehicle beneath the low floor region, the floor stringer being attached to the cross member,
wherein the battery pack is attached to the floor stringer.

4. The vehicle body structure according to claim 2, further comprising:
a floor stringer extending in a front-back direction of the vehicle beneath the low floor region, the floor stringer being attached to the cross member,
wherein the battery pack is attached to the floor stringer.

5. The vehicle body structure according to claim 1, wherein the cross member is configured to be bent with the weak portion located in a bending position and moved downward so as to raise the electric device relative to the weak portion.

6. The vehicle body structure according to claim 2, wherein the cross member is configured to be bent with the weak portion located in a bending position and moved downward so as to raise the electric device relative to the weak portion.

7. The vehicle body structure according to claim 3, wherein the cross member is configured to be bent with the weak portion located in a bending position and moved downward so as to raise the electric device relative to the weak portion.

8. The vehicle body structure according to claim 4, wherein the cross member is configured to be bent with the weak portion located in a bending position and moved downward so as to raise the electric device relative to the weak portion.

9. The vehicle body structure according to claim 1, wherein the cross member has a groove shape with a lower surface thereof opened, and having a rectangular section, and wherein the weak portion has a hole passing through a corner portion of the section.

10. The vehicle body structure according to claim 2, wherein the cross member has a groove shape with a lower surface thereof opened, and having a rectangular section, and wherein the weak portion has a hole passing through a corner portion of the section.

11. The vehicle body structure according to claim 3, wherein the cross member has a groove shape with a lower surface thereof opened, and having a rectangular section, and wherein the weak portion has a hole passing through a corner portion of the section.

12. The vehicle body structure according to claim 4, wherein the cross member has a groove shape with a lower surface thereof opened, and having a rectangular section, and wherein the weak portion has a hole passing through a corner portion of the section.

* * * * *